US010887200B2

(12) United States Patent
Strater et al.

(10) Patent No.: US 10,887,200 B2
(45) Date of Patent: Jan. 5, 2021

(54) BAND STEERING USING DEEP PACKET INSPECTION

(71) Applicant: ARRIS Enterprises LLC, Suwanee, GA (US)

(72) Inventors: Jay Strater, San Diego, CA (US); Subha Rajasekar, Pleasanton, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 42 days.

(21) Appl. No.: 15/845,536

(22) Filed: Dec. 18, 2017

(65) Prior Publication Data

US 2018/0123916 A1 May 3, 2018

Related U.S. Application Data

(63) Continuation of application No. 14/887,893, filed on Oct. 20, 2015, now Pat. No. 9,876,691.

(51) Int. Cl.
| | |
|---|---|
| *H04L 12/26* | (2006.01) |
| *H04W 28/02* | (2009.01) |
| *H04W 72/04* | (2009.01) |
| *H04W 48/20* | (2009.01) |
| *H04W 28/08* | (2009.01) |

(52) U.S. Cl.
CPC ....... *H04L 43/028* (2013.01); *H04W 28/0284* (2013.01); *H04W 28/08* (2013.01); *H04W 48/20* (2013.01); *H04W 72/0453* (2013.01); *H04L 43/0817* (2013.01)

(58) Field of Classification Search
CPC .. H04L 43/028; H04L 43/0817; H04W 28/08; H04W 48/20; H04W 72/0453; H04W 28/0284
See application file for complete search history.

(56) References Cited

U.S. PATENT DOCUMENTS

| | | | |
|---|---|---|---|
| 8,630,307 B2 | 1/2014 | Wu et al. | |
| 9,876,691 B2 * | 1/2018 | Strater | ................. H04L 43/028 |
| 10,757,116 B2 * | 8/2020 | Ardeli | ................. H04L 63/1408 |
| 2008/0096575 A1 * | 4/2008 | Aragon | ................. H04W 36/22 |
| | | | 455/453 |
| 2010/0312892 A1 * | 12/2010 | Woundy | ............. H04L 41/0893 |
| | | | 709/226 |

(Continued)

*Primary Examiner* — Christopher P Grey
(74) *Attorney, Agent, or Firm* — Wenderoth, Lind & Ponack, L.L.P.

(57) ABSTRACT

Methods, systems, and computer readable media may be operable to facilitate client device band steering based upon deep packet inspection information. An access point may be configured to steer one or more client devices from a low frequency band to a high frequency band, and vice versa, based on the status of the low frequency band and/or high frequency band and the client devices associated with the bands. The access point may perform a deep packet inspection of data packet traffic associated with each associated client device, and may classify each client device as either a device associated with a media session or a device that is not associated with a media session based upon information retrieved from the deep packet inspection. The access point may choose one or more client devices to disassociate from a frequency band based upon the media session classification of the client devices.

11 Claims, 5 Drawing Sheets

(56) References Cited

U.S. PATENT DOCUMENTS

| | | | |
|---|---|---|---|
| 2012/0202498 A1* | 8/2012 | Sachs | H04W 28/18 |
| | | | 455/436 |
| 2013/0308543 A1* | 11/2013 | Cordeiro | H04W 72/02 |
| | | | 370/328 |
| 2014/0059218 A1* | 2/2014 | Ganu | H04W 12/08 |
| | | | 709/224 |
| 2015/0271829 A1* | 9/2015 | Amini | H04W 24/02 |
| | | | 370/329 |
| 2015/0319657 A1* | 11/2015 | Fan | H04W 48/16 |
| | | | 370/332 |
| 2016/0036657 A1* | 2/2016 | Ardeli | H04W 48/20 |
| | | | 370/235 |
| 2016/0036833 A1* | 2/2016 | Ardeli | H04L 63/101 |
| | | | 726/22 |
| 2016/0088521 A1* | 3/2016 | Ho | H04W 28/08 |
| | | | 455/453 |
| 2016/0112903 A1* | 4/2016 | Kaushik | H04W 28/0205 |
| | | | 370/235 |
| 2017/0111854 A1* | 4/2017 | Ho | H04B 7/14 |
| 2018/0048578 A1* | 2/2018 | Rollet | H04L 43/026 |

* cited by examiner

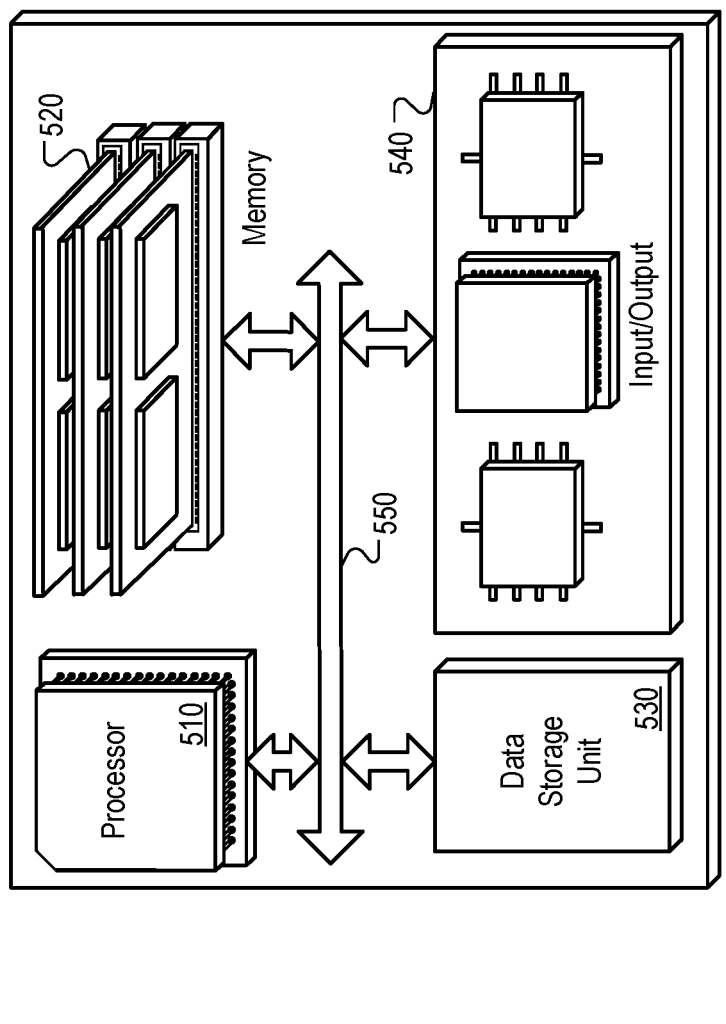

BAND STEERING USING DEEP PACKET INSPECTION

TECHNICAL FIELD

This disclosure relates to steering data clients from one frequency band to another.

BACKGROUND

Typically, a wireless access point may offer a plurality of service sets to a customer premise for the delivery of wireless communications between the access point and one or more client devices or stations, and the service sets may be provided over a plurality of frequency bands. For example, some wireless access points installed within a customer premise may include both a low frequency band (e.g., 2.4 GHz) and a high frequency band (e.g., 5 GHz band). Each frequency band offered by an access point may have advantages and disadvantages relative to other frequency bands.

Generally, a high frequency band is preferred for the delivery of media sessions (e.g., video) to client devices, assuming the high frequency band experiences lower levels of interference and has more flexible band options than a low frequency band. In addition, the time-sensitive nature of video services will generally require that delivery of video streams be given priority over data streams when the resources of a frequency band are stressed, and this prioritization may negatively impact data streams that share a frequency band with one or more video streams.

In some instances, one frequency band offered by the access point may become overloaded while another frequency band offered by the access point has excess capacity for delivering multiple services to client devices. When such a case arises, it is beneficial to force one or more client devices from the overloaded frequency band to the frequency band having excess capacity. The access point may steer one or more client devices using an excessive amount of wireless network resources from the overloaded frequency band to the frequency band having excess capacity. Several factors may go into deciding which client(s) to move to the other band (e.g., dual band support, signal strength, traffic load, current traffic activity, etc.).

The type of session being received by a client device may dictate whether the client device should remain on a current band or be steered to the other band. However, a client device's media session status is typically unknown by the access point. Moreover, the previously under-utilized frequency band may quickly become overloaded without careful consideration be given to the client devices and associated streaming sessions that are steered away from the previously overloaded frequency band. Therefore, it is desirable to improve upon methods, systems and apparatuses for band steering of one or more client devices.

BRIEF DESCRIPTION OF THE DRAWINGS

FIG. 5 is a block diagram of a hardware configuration operable to facilitate client device band steering based upon deep packet inspection information.

Like reference numbers and designations in the various drawings indicate like elements.

DETAILED DESCRIPTION

Figure 1:
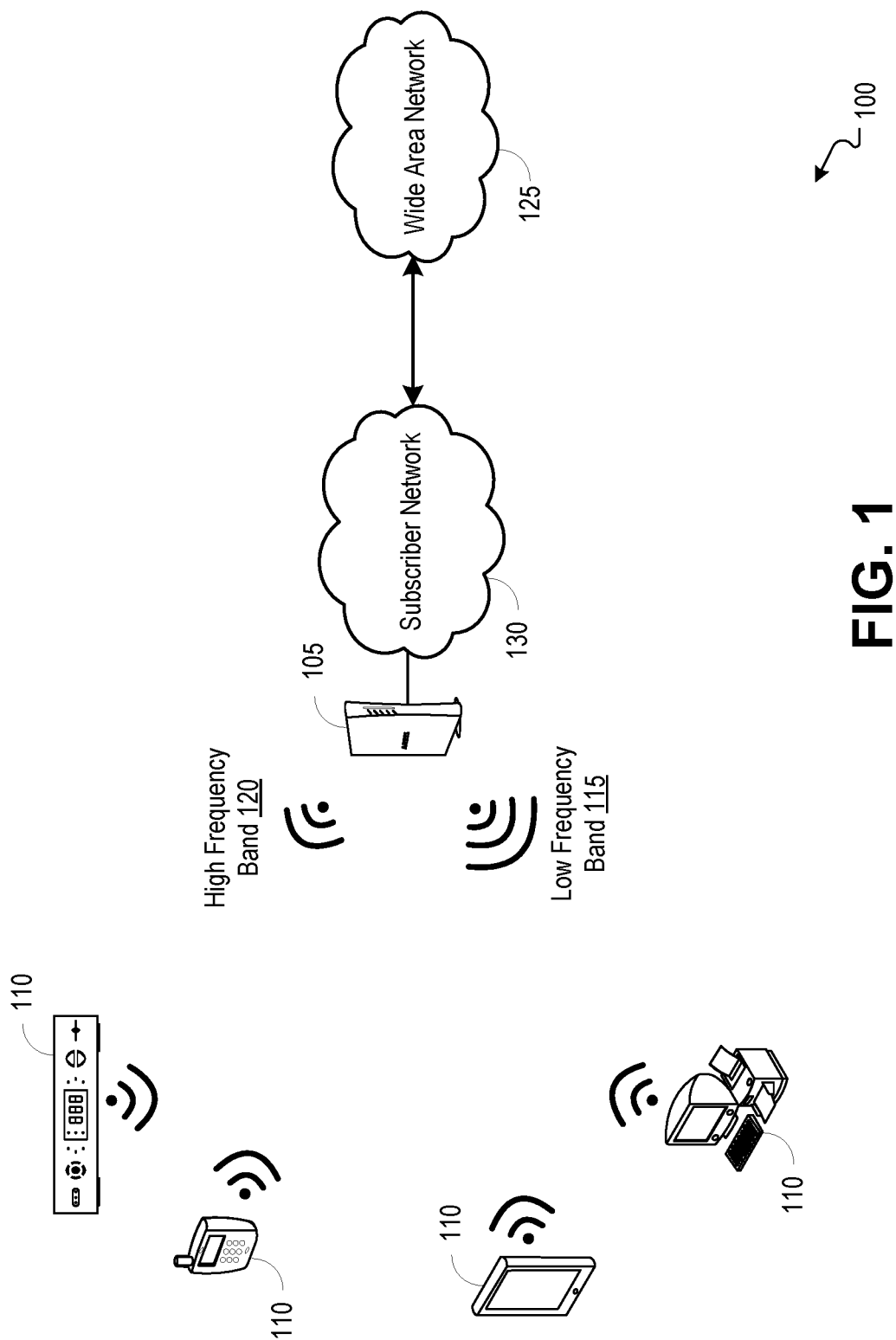
FIG. 1 is a block diagram illustrating an example network environment operable to facilitate client device band steering based upon deep packet inspection information.

It is desirable to provide methods and systems operable to facilitate client device band steering. Methods, systems, and computer readable media may be operable to facilitate client device band steering based upon deep packet inspection information. An access point may be configured to steer one or more client devices from a low frequency band to a high frequency band, and vice versa, based on the status of the low frequency band and/or high frequency band and the client devices associated with the bands. The access point may perform a deep packet inspection of data packet traffic associated with each associated client device, and may classify each client device as either a device associated with a media session or a device that is not associated with a media session based upon information retrieved from the deep packet inspection. The access point may choose one or more client devices to disassociate from a frequency band based upon the media session classification of the client devices.

An embodiment of the invention described herein may include a method comprising: (a) monitoring the status of one or more frequency bands; (b) determining that a condition exists for disassociating one or more client devices from a first frequency band, wherein the condition is based upon the monitored status of the one or more frequency bands; (c) identifying one or more client devices associated with the first frequency band; (d) determining whether each respective one of the one or more client devices associated with the first frequency band is associated with a media session; (e) identifying at least one client device from the one or more client devices associated with the first frequency band, wherein the at least one client device is identified based upon the determination whether the at least one client device is associated with a media session; and (f) disassociating the at least one identified client device from the first frequency band.

According to an embodiment of the invention, the first frequency band is associated with a higher frequency than the frequency associated with a second frequency band, and the at least one identified client device comprises at least one client device determined not to be associated with a media session.

According to an embodiment of the invention, the method described above further comprises: (a) for each respective one of the one or more client devices associated with the first frequency band, measuring one or more parameters associated with the resource demand placed on the first frequency band by the respective one client device; and (b) wherein the at least one identified client device comprises a client device that is determined not to be associated with a media session and that places the largest resource demand on the first frequency band relative to the other client devices that are associated with the first frequency band and that are determined not to be associated with a media session.

According to an embodiment of the invention, the condition for disassociating one or more client devices from a first frequency band comprises a determination that the excess data capacity associated with the first frequency band is less than a predetermined threshold.

According to an embodiment of the invention, the first frequency band is associated with a lower frequency than the frequency associated with a second frequency band, and the at least one identified client device comprises at least one client device determined to be associated with a media session.

According to an embodiment of the invention, the method described above further comprises: (a) for each respective one of the one or more client devices associated with the first frequency band, measuring one or more parameters associated with the resource demand placed on the first frequency band by the respective one client device; and (b) wherein the at least one identified client device comprises a client device that is determined to be associated with a media session and that places the smallest resource demand on the first frequency band relative to the other client devices that are associated with the first frequency band and that are determined to be associated with a media session.

According to an embodiment of the invention, the condition for disassociating one or more client devices from a first frequency band in favor of steering the client device to an association with a second frequency band comprises a determination that the amount of available bandwidth associated with the second frequency band is greater than a predetermined threshold.

According to an embodiment of the invention, the method described above further comprises adding the at least one identified client device to a black list associated with the first frequency band, wherein the black list includes one or more client devices that are not allowed to associate with the first frequency band.

According to an embodiment of the invention, the determination whether a respective one client device is associated with a media session is based upon characteristics of one or more packets being output to the respective one client device, wherein the characteristics are retrieved through a deep packet inspection of the one or more packets.

An embodiment of the invention described herein may include an apparatus comprising: (a) one or more interfaces configured to be used to provide a first frequency band and a second frequency band to one or more client devices; and (b) one or more modules configured to: (i) monitor the status of one or more frequency bands; (ii) determine that a condition exists for disassociating one or more client devices from the first frequency band in favor of steering the client device to an association with the second frequency band, wherein the condition is based upon the monitored status of the one or more frequency bands; (iii) identify one or more client devices associated with the first frequency band; (iv) determine whether each respective one of the one or more client devices associated with the first frequency band is associated with a media session; (v) identify at least one client device from the one or more client devices associated with the first frequency band, wherein the at least one client device is identified based upon the determination whether the at least one client device is associated with a media session; and (vi) initiate a disassociation of the at least one identified client device from the first frequency band.

An embodiment of the invention described herein may include one or more non-transitory computer readable media having instructions operable to cause one or more processors to perform the operations comprising: (a) monitoring the status of one or more frequency bands; (b) determining that a condition exists for disassociating one or more client devices from a first frequency band in favor of steering the client device to an association with a second frequency band, wherein the condition is based upon the monitored status of the one or more frequency bands; (c) identifying one or more client devices associated with the first frequency band; (d) determining whether each respective one of the one or more client devices associated with the first frequency band is associated with a media session; (e) identifying at least one client device from the one or more client devices associated with the first frequency band, wherein the at least one client device is identified based upon the determination whether the at least one client device is associated with a media session; and (f) disassociating the at least one identified client device from the first frequency band.

FIG. 1 is a block diagram illustrating an example network environment 100 operable to facilitate client device band steering based upon deep packet inspection information. In embodiments, an access point 105 may route communications to and from one or more client devices 110. For example, the one or more client devices 110 may be provisioned to receive video service(s), data service(s), and/or voice services through one or more access points 105. In embodiments, an access point 105 may include a gateway, a cable modem, a wireless router including an embedded cable modem, a mobile hot-spot router, a multimedia over coaxial alliance (MoCA) node, a wireless extender, and any other device that is operable to route communications to and from a client device 110. An access point 105 may include dual-band wireless local area network (LAN) (e.g. IEEE 802.11) support that may be included in a router with digital subscriber line (DSL), Ethernet, optical, or cable modem wide area network (WAN) interface. An access point 105 may also include non-wireless LAN-side technologies (e.g., G.hn, multimedia over coaxial alliance (MoCA), etc.) to route communications to and from a client device 110.

In embodiments, client devices 110 may include a wide variety of devices such as televisions, mobile devices, tablets, set-top boxes, computers, and any other device that is capable of utilizing a video, data, or telephony service. In embodiments, the access point 105 may route communications to and from client devices 110 through one or more wireless service sets (e.g. IEEE 802.11 service sets) that are offered over one or more frequency bands. For example, a client device 110 may be associated with a low frequency band 115 (e.g., 2.4 GHz industrial, scientific and medical (ISM) band) or high frequency band 120 (e.g., 5 GHz ISM band). The access point 105 may receive one or more data streams from an upstream network (e.g., subscriber network 130 of FIG. 1), and may output data packets associated with the data streams to targeted client devices over either the low frequency band 115 or high frequency band 120, depending on which band the targeted client devices are associated with. Communications between client devices 110 and one or more access points 105 may include wireless communications (e.g., 802.11 packet exchanges).

In embodiments, an access point 105 may route communications between client device(s) 110 and a wide area network (WAN) 125 via a subscriber network 130. The subscriber network 130 may include various networks such as coaxial cable, optical fiber, twisted pair network, wireless networks including 4G and LTE, and others.

In embodiments, when a client device 110 initially connects to an access point 105, the client device 110 may associate with a service set that is provided by the access point 105 over either a low frequency band 115 or high frequency band 120. Band-steering includes the moving of a dual-band client device 110 between a common service set (e.g. Wi-Fi SSID used for data services) in both frequencies.

Initially, the client device 110 may choose the frequency band for a common SSID based upon various factors including, but not limited to signal strength. For example, the client device 110 may be preconfigured to associate with a frequency band exhibiting the strongest signal with the client device 110.

In embodiments, the access point 105 may receive communications targeted to a client device 110 from a subscriber network 130 and may route the communications to the targeted client device 105 over the frequency band with which the client device 110 is associated. The access point 105 may monitor the status of each of the frequency bands provided by the access point 105 (e.g., low frequency band 115 and high frequency band 120). For example, the access point 105 may take a measurement of parameters associated with the transmission of data packets (e.g., transmit airtime, physical layer (PHY) rate, number of transmit retries, etc.) associated with each data stream being output from the access point 105 to one or more client devices 110.

In embodiments, the access point 105 may inspect one or more data packets from each data stream being output from the access point 105 to a client device 110 (e.g., downstream data packets/data stream). It should be understood that one or more upstream data packets (e.g., data packets received by the access point 105 from one or more client devices 110) may be inspected in order to classify one or more sessions associated with the one or more client devices 110. Using deep packet inspection (DPI), the access point 105 may utilize a DPI signature file to classify a data stream as a stream associated with a media session or a stream that is not associated with a media stream. For example, the DPI signature file may be downloaded, updated, and stored at the access point 105.

Using DPI, the access point 105 may retrieve information from one or more client device streams indicating a traffic category (e.g., media, video, gaming, web, mail, etc.), application processing the data stream (e.g., Netflix, Amazon Video, etc.), device type receiving the data stream (e.g., STB, gaming device, mobile device, tablet, computer, etc.), and other characteristics associated with the one or more streams. As an example, a data stream having a traffic classification of 'Video,' or 'Media,' a data stream being processed by an application such as Netflix or Amazon Video, and/or a data stream being received by a media player (e.g., media player at a mobile device, tablet, etc.) may individually or in combination with each other provide an indication to the access point 105 that the data stream is associated with a media session.

In embodiments, the access point 105 may determine that one or more client devices 110 associated with the access point 105 should be disassociated from one band and associated with another band. When a data congestion condition arises on the high frequency band 120 and sufficient capacity remains on the low frequency band, the access point 105 may initiate a process for steering one or more client devices 110 away from the high frequency band 120 and onto the low frequency band 115. When the determination is made that inadequate capacity remains on the low frequency band but spare (i.e., excessive) capacity exists on the high frequency band 120, the access point 105 may initiate a process for steering one or more client devices 110 away from the low frequency band 115 and onto the high frequency band 120.

In embodiments, the access point 105 may identify one or more client devices 110 to be disassociated from one frequency band and associated with another frequency band based upon measured parameters associated with the transmission of data packets to client device(s) 110 and a classification of each client device 110 as either a client device 110 associated with a media session or a client device 110 not associated with a media session. For example, when a data congestion condition arises on the high frequency band 120 and sufficient capacity remains on the low frequency band, the access point 105 may identify the client device currently associated with the high frequency band 120 that is not associated with a media session and that has the highest air-time demand relative to other client devices that are not associated with a media session, and the identified client device 110 may be disassociated from the high frequency band 115. As another example, when the determination is made that inadequate capacity remains on the low frequency band and spare capacity exists on the high frequency band 120, the access point 105 may identify the client device currently associated with the low frequency band 115 that is associated with a media session and that has the lowest air-time demand relative to other client devices that are associated with a media session, and the identified client device 110 may be disassociated from the low frequency band 120. It should be understood that a further determination may be made regarding an identified client device's capability to move to another frequency band. For example, the access point 105 may select a client device 110 from a group of client devices that are capable of switching to another frequency band.

In embodiments, once a client device 110 is forced by the access point 105 to disassociate from a frequency band, the client device 110 may be added to a black list associated with the frequency band. Subsequent attempts by the client device 110 to join the frequency band from which the client device 110 was disassociated will be blocked by the access point 105, thereby steering the client device 110 to associate with a different frequency band.

Figure 2:
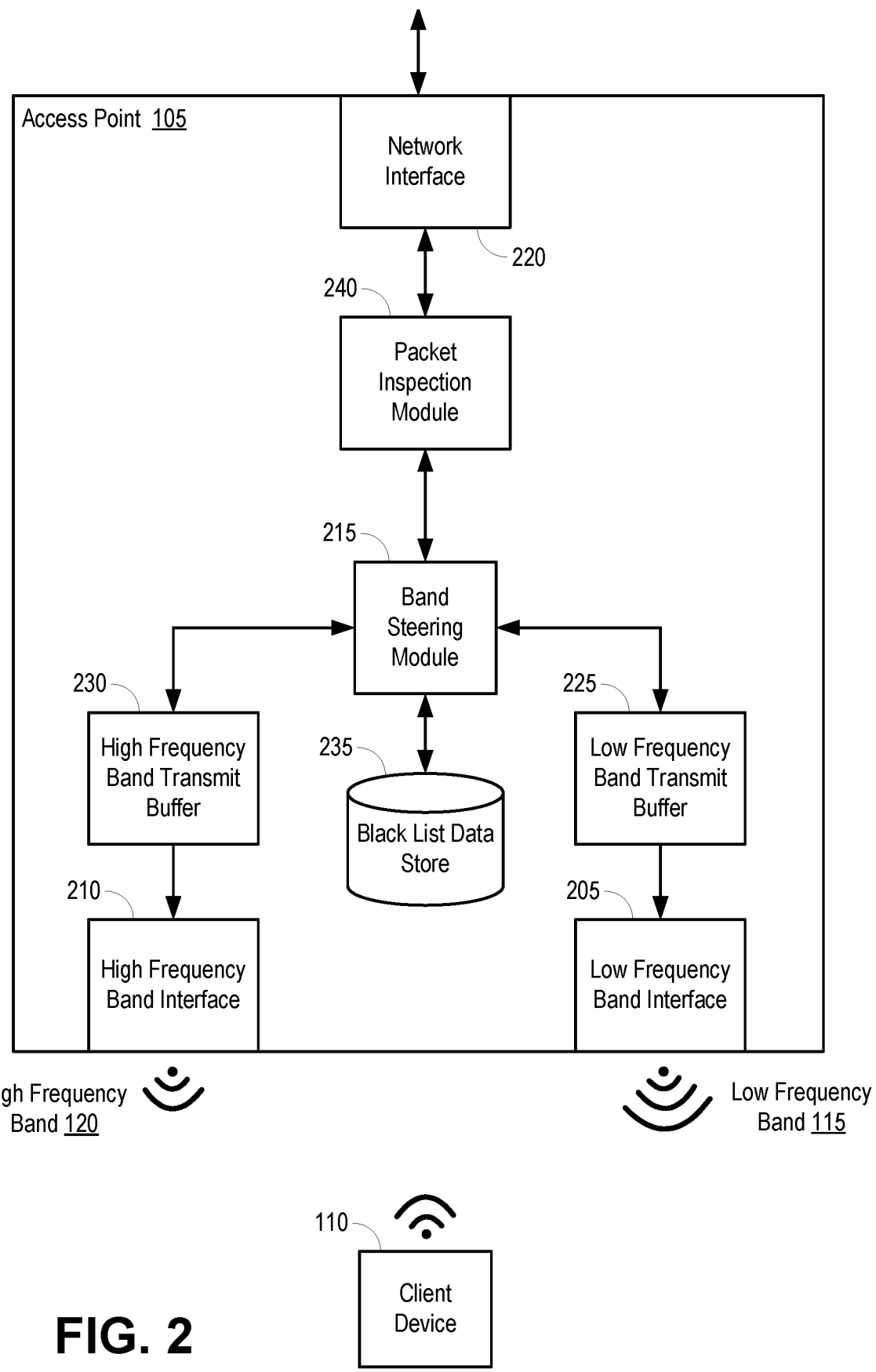
FIG. 2 is a block diagram illustrating an example access point operable to facilitate client device band steering based upon deep packet inspection information.

FIG. 2 is a block diagram illustrating an example access point 105 operable to facilitate client device band steering based upon deep packet inspection information. The access point 105 may include a low frequency band interface 205, a high frequency band interface 210, a band steering module 215, a network interface 220, a low frequency band transmit buffer 225, a high frequency band transmit buffer 230, a black list data store 235, and a packet inspection module 240.

In embodiments, the access point 105 may route communications to and from client devices 110 through one or more service sets that are offered over one or more frequency bands. For example, a client device 110 may be associated with a low frequency band 115 (e.g., 2.4 GHz) or a high frequency band 120 (e.g., 5 GHz). The access point 105 may receive one or more data streams from an upstream network (e.g., subscriber network 130 of FIG. 1) through the network interface 220, and may output data packets associated with the data streams to targeted client devices through the low frequency band interface 205 or high frequency band interface 210 depending on which band the targeted client devices are associated with.

In embodiments, data packets received at the access point 105 may be passed through the band steering module 215, and the band steering module 215 may identify the client device to which each respective data packet is targeted. The band steering module 215 may determine which band (e.g., low frequency band 115 or high frequency band 120) the identified client device is associated with, and may direct the respective data packet to a corresponding transmit buffer (e.g., low frequency band transmit buffer 225 or high frequency band transmit buffer 230).

In embodiments, the band steering module 215 may monitor the status of the low frequency band transmit buffer 225 and high frequency band transmit buffer 230, and the band steering module 215 may make a determination as to the status of the corresponding low frequency band 115 and high frequency band 120 based upon measurements taken of one or more parameters from the transmit buffers. For example, the band steering module 215 may retrieve measurements of parameters associated with the transmission of data packets (e.g., transmit airtime, physical layer (PHY) rate, number of transmit retries, etc.) associated with each data stream being output from each of the transmit buffers. The band steering module 215 may further determine the current utilization of each transmit buffer by monitoring the number of data packets at each buffer.

In embodiments, the band steering module 215 may determine that one or more client devices associated with the access point 105 should be disassociated from one band and associated with another band. When a data congestion condition arises on the high frequency band 120 and sufficient capacity remains on the low frequency band, the band steering module 215 may initiate a process for steering one or more client devices away from the high frequency band 120 and onto the low frequency band 115. When the determination is made that inadequate capacity remains on the low frequency band and spare capacity exists on the high frequency band, the band steering module 215 may initiate a process for steering one or more client devices away from the low frequency band 115 and onto the high frequency band 120.

In embodiments, the packet inspection module 240 may inspect one or more data packets from each data stream being output from the access point 105 to a client device 110. Using deep packet inspection (DPI), the information within a DPI signature file may be used by the packet inspection module 240 to classify a data stream as a data stream associated with a media session or a data stream that is not associated with a media stream. The packet inspection module 240 may retrieve information from one or more data packets indicating a traffic category (e.g., media, video, gaming, web, mail, etc.), application processing the data stream (e.g., Netflix, Amazon Video, etc.), device type receiving the data stream (e.g., STB, gaming device, mobile device, tablet, computer, etc.), and other characteristics associated with the one or more data packets. As an example, a data stream having a traffic classification of 'Video,' or 'Media,' a data stream being processed by an application such as Netflix or Amazon Video, and/or a data stream being received by a media player may individually or in combination with each other provide an indication to the packet inspection module 240 that the data stream is associated with a media session.

In embodiments, the band steering module 215 may identify one or more client devices that are to be disassociated from the high frequency band 120 and associated with the low frequency band 115. The band steering module 215 may maintain a list of the client devices that are associated with the high frequency band 120. Each client device within the list may be associated with an air-time demand (e.g., the amount of air-time currently required by one or more data streams being output to the client device) and/or a data session type classification (e.g., associated with a media session or not associated with a media session). When a data congestion condition arises on the high frequency band 120 with the potential to starve one or more clients and sufficient capacity remains on the low frequency band, the band steering module 215 may identify the client device currently associated with the high frequency band 120 that is not associated with a media session and that has the highest air-time demand relative to other client devices that are not associated with a media session. The band steering module 215 may add the identified client device to a high frequency band black list (e.g., black list stored at the black list data store 235), and may force the identified client device to disassociate from the high frequency band 120. Once disassociated from the high frequency band 120, the identified client device will be steered to associate with the low frequency band 115 because the identified client device has been added to the high frequency band black list and will be precluded from associating with the high frequency band 120.

In embodiments, the band steering module 215 may identify one or more client devices that are to be disassociated from the low frequency band 115 and associated with the high frequency band 120. The band steering module 215 may maintain a list of the client devices that are associated with the low frequency band 115. Each client device within the list may be associated with an air-time demand (e.g., the amount of air-time currently required by one or more data streams being output to the client device) and/or a data session type classification (e.g., associated with a media session or not associated with a media session). When the determination is made that inadequate capacity remains on the low frequency band and sufficient spare capacity exists on the high frequency band 120, the band steering module 215 may identify the client device currently associated with the low frequency band 115 that is associated with a media session and that has the lowest air-time demand relative to other client devices that are associated with a media session. The band steering module 215 may add the identified client device to a low frequency band black list (e.g., black list stored at the black list data store 235), and may force the identified client device to disassociate from the low frequency band 115. Once disassociated from the low frequency band 115, the identified client device will be steered to associate with the high frequency band 120 because the identified client device has been added to the low frequency band black list and will be precluded from associating with the low frequency band 115.

In embodiments, the band steering module 215 may filter client devices identified for disassociation from a frequency band based upon client device history of wireless network resource use. For example, a client device identified for disassociation from a low frequency band 115 may have previously been disassociated from a high frequency band 120 for excessive use of wireless network resources. The band steering module 215 may identify the prior disassociation of the client device and may preclude a disassociation of the client device from the low frequency band 115, thereby preventing the client device from re-joining the high frequency band 120 and potentially using an excessive amount of wireless network resources dedicated to the high frequency band 120. The band steering module 215 may preclude the disassociation of a client device from the high frequency band 120 or may prioritize the disassociation of a client device from the low frequency band 120 based on the determination of an application associated with a media session being output to the client device. For example, using DPI, the packet inspection module 240 may identify an application and/or a user prioritization of the application associated with the media session being output to the client device.

Figure 3:
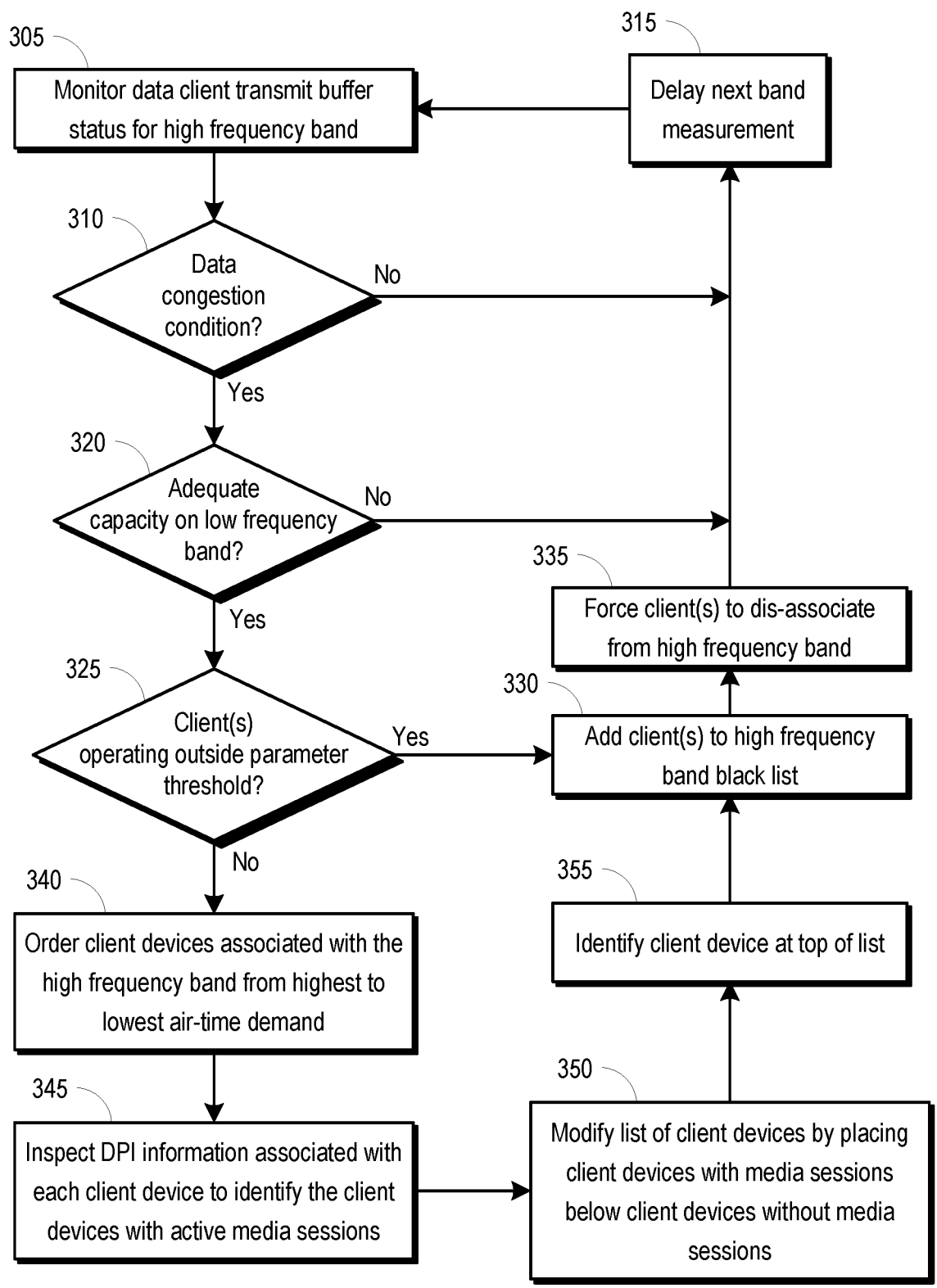
FIG. 3 is a flowchart illustrating an example process operable to facilitate band steering of a client device from a high frequency band to a low frequency band.

FIG. 3 is a flowchart illustrating an example process 300 operable to facilitate band steering of a client device from a high frequency band to a low frequency band. The process 300 may begin at 305, when the determination is made to check the status of one or more frequency bands including at least one high frequency band and one low frequency band. For example, an access point (e.g., access point 105 of FIG. 1) may be configured to periodically check the status of one or more frequency bands associated with the access point.

At 305, the status of a data client transmit buffer associated with a high frequency band (e.g., 5 GHz band) may be determined. The status of a data client transmit buffer (e.g., high frequency band transmit buffer 230 of FIG. 2) may be determined, for example, by the access point 105 (e.g., by the band steering module 215 of FIG. 2). In embodiments, the determined status of the high frequency band transmit buffer 230 may be based upon the current utilization of the high frequency band transmit buffer 230. For example, the status of the high frequency band transmit buffer 230 may be based upon the capacity of the buffer and the number of packets currently queued in the buffer.

At 310, a determination may be made whether a data congestion condition exists for the high frequency band. The determination whether a data congestion condition exists for the high frequency band (e.g., high frequency band 120 of FIG. 1) may be made, for example, by the access point 105 (e.g., by the band steering module 215 of FIG. 2). In embodiments, a data congestion condition may be defined at the access point 105 as a condition of the high frequency band 120 wherein the high frequency band 120 has no excess data capacity after accounting for operator allocated video capacity (e.g., video having scheduled queuing). For example, the determination may be made that a data congestion condition exists in the high frequency band 120 when the data being transmitted over the high frequency band 120 is equivalent to the capacity of the high frequency band 120. It should be understood that the access point 105 may be configured to recognize a data congestion condition in other instances, such as when the amount of data being delivered over the high frequency band 120 is greater than a predetermined amount but is less than the capacity of the high frequency band 120. The access point 105 may be configured to recognize a data congestion condition when the excess data capacity of the high frequency band 120 drops below a predetermined threshold.

If, at 310, the determination is made that a data congestion condition does not exist in the high frequency band 120, the process 300 may proceed to 315. At 315, the access point 105 may delay a next band measurement. For example, a delay period may be established at the access point 105 wherein the access point 105 must wait for the duration of the delay period before conducting a subsequent measurement of the high frequency band transmit buffer 220 and high frequency band 120. The delay period may be a configurable setting at the access point 105 and may, for example, be short enough to allow for a timely response to a data issue, but be long enough to avoid an unnecessary impact on processor performance at the access point 105. It should be appreciated that the delay period may be set to zero when a continuous monitoring of the band is desired.

If, at 310, the determination is made that a data congestion condition does exist in the high frequency band 120, the process 300 may proceed to 320. At 320, the determination may be made whether there is adequate capacity on a low frequency band (e.g., low frequency band 115 of FIG. 1). The determination whether there is adequate capacity on a low frequency band 115 may be made, for example, by the access point 105 (e.g., by the band steering module 215 of FIG. 2). In embodiments, the determination whether the low frequency band 115 has adequate capacity may be based upon the resource capacity (e.g., bandwidth) available on the band. For example, if the band steering module 215 determines that the low frequency band 115 has enough bandwidth to support an additional session with a client device (e.g., client device 110 of FIG. 1), the determination may be made that the low frequency band 115 has adequate capacity. If the determination is made that the low frequency band 115 does not have adequate capacity, the process 300 may proceed to 315 where a next band measurement is delayed.

If, at 320, the determination is made that there is adequate capacity on the low frequency band to support an additional client session, the process 300 may proceed to 325. At 325, the determination may be made whether one or more client devices (e.g., client devices 110 of FIG. 1) receiving data over the high frequency band 120 are operating outside of a parameter threshold. The determination whether one or more client devices are operating outside of a parameter threshold may be made, for example, by the access point 105 (e.g., by the band steering module 215 of FIG. 2). In embodiments, the access point 105 may measure one or more parameters (e.g., transmit airtime, physical layer (PHY) rate, number of transmit retries, etc.) associated with the transmission of data to each of one or more client devices receiving data over the high frequency band 120. Settings at the access point 105 may define constraints or thresholds for each of the measured client device parameters (e.g., maximum transmit airtime, minimum PHY rate, maximum number of transmit retries, etc.). For example, a maximum recommended transmit airtime for a client device may be configured to reflect best effort queue utilization by the client device.

If, at 325, the determination is made that one or more client devices are operating outside of a parameter threshold, the process 300 may proceed to 330. At 330, the one or more client devices that are operating outside of a parameter threshold may be added to a high frequency band black list. The high frequency band black list may be stored at the black list data store 235 of FIG. 2. In embodiments, the high frequency band black list may include client devices that are to be precluded from associating with the high frequency band. Where a client device operating outside of a parameter threshold is listed in a low frequency band black list, the client device may be removed from the low frequency band black list before being added to the high frequency band black list.

At 335, one or more client devices operating outside of a parameter threshold may be forced to disassociate from the high frequency band. For example, the access point 105 may output to the client device(s) a command to disassociate from the high frequency band (e.g., 802.11 disassociation command). Once the one or more client devices are disassociated from the high frequency band, and since the one or more client devices are now listed in the high frequency band black list, the one or more client devices may be forced to associate with a low frequency band.

Returning to 325, if the determination is made that one or more clients are not operating outside of a parameter threshold, the process 300 may proceed to 340. At 340, a list of client devices associated with the high frequency band may be generated, wherein the client devices are ordered in the list from highest to lowest air-time demand. It should be understood that the client devices may be ordered based on various other factors that can provide an indication of the wireless resources consumed by the individual client devices. For example, the client devices may be ordered in the list from weakest received signal strength indication (RSSI) to strongest RSSI.

At 345, DPI information associated with each client may be inspected to identify one or more client devices with active media sessions. DPI information may be retrieved and inspected, for example, by an access point 105 (e.g., by the packet inspection module 240 of FIG. 2). DPI information may be retrieved from a data stream that is being output to a client device over the high frequency band, and the DPI information may be used to classify the data stream being output to the client device. For example, a DPI signature file may be inspected, and the DPI signature file may include an identification or indication of a traffic category (e.g., media, video, gaming, web, mail, etc.), application processing the data stream (e.g., Netflix, Amazon Video, etc.), device type receiving the data stream (e.g., STB, gaming device, mobile device, tablet, computer, etc.), and others. Using the DPI information retrieved from a data stream, the packet inspection module 240 may determine whether the data stream is associated with a media session. For example, a data stream having a traffic classification of 'Video,' or 'Media,' a data stream being processed by an application such as Netflix or Amazon Video, and/or a data stream being received by a media player may individually or in combination with each other provide an indication to the packet inspection module 240 that the data stream is associated with a media session.

At 350, the list of client devices associated with the high frequency band may be modified based upon a classification of each client device as either a device receiving a data stream associated with a media session or a device that is not receiving a data stream associated with a media session. The list of client devices may be modified, for example, by the access point 105 (e.g., by the band steering module 215). In embodiments, the previous ordering of the client devices from highest to lowest airtime demand may be maintained, but each client device receiving a data stream associated with a media session is placed below all client devices not receiving a data stream associated with a media session such that the highest listed client device is a client device that has the highest airtime demand and that is not receiving a data stream associated with a media session.

At 355, the client device at the top of the modified list of client devices associated with the high frequency band may be identified. The highest listed client device may be identified, for example, by the access point 105 (e.g., by the band steering module 215). In embodiments, the modified list of client devices is ordered such that the highest listed client device is the client device not receiving a data stream associated with a media session that has the highest airtime demand relative to other client devices that are not receiving a data stream associated with a media session. The band steering module 215 may steer the identified client device away from the high frequency band such that the identified client device may associate with a low frequency band. For example, the identified client device may be added to the high frequency band black list at 330 and may be forced to disassociate from the high frequency band at 335.

Figure 4:
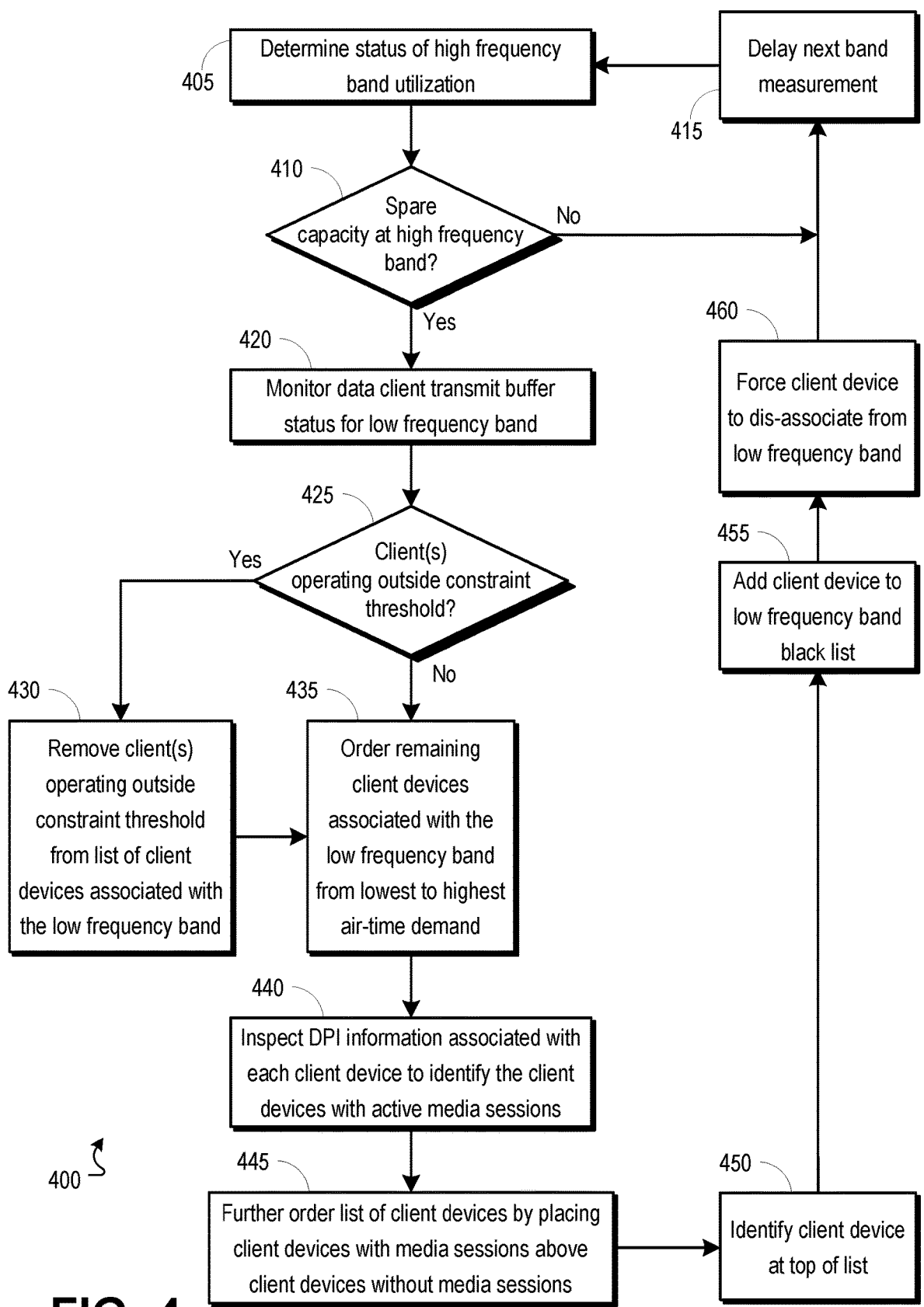
FIG. 4 is a flowchart illustrating an example process operable to facilitate band steering of a client device from a low frequency band to a high frequency band.

FIG. 4 is a flowchart illustrating an example process 400 operable to facilitate band steering of a client device from a low frequency band to a high frequency band. The process 400 may begin at 405, when the determination is made to check the status of one or more frequency bands including at least one high frequency band and one low frequency band. For example, an access point (e.g., access point 105 of FIG. 1) may be configured to periodically check the status of one or more frequency bands associated with the access point. In embodiments, the process 400 may begin at 405 when a determination is made that the available capacity at a low frequency band (e.g., low frequency band 115 of FIG. 1) is less than a predetermined threshold (e.g., a percentage of a capacity associated with the band).

At 405, the status of a high frequency band may be determined. The status of a high frequency band (e.g., high frequency band 120 of FIG. 1) may be determined, for example, by the access point 105 (e.g., by the band steering module 215 of FIG. 2). In embodiments, the band steering module 215 may monitor the output of data to a high frequency band transmit buffer 230 of FIG. 2 and the output of data through a high frequency band interface 210 of FIG. 2 to determine the amount of bandwidth being utilized by current data streams being delivered to client devices over the high frequency band 120.

At 410, the determination may be made whether spare capacity exists on the high frequency band. The determination whether spare capacity exists on the high frequency band may be made, for example, by the access point 105 (e.g., by the band steering module 215 of FIG. 2). In embodiments, the band steering module 215 may determine the bandwidth that is available for the high frequency band 120 (e.g., by finding the difference between the maximum bandwidth for the high frequency band 120 and the bandwidth currently being utilized by client devices receiving data over the high frequency band 120). For example, spare capacity on the high frequency band may be defined as a condition existing on the high frequency band wherein the amount of available bandwidth is greater than a predetermined threshold. The available bandwidth may be compared to a threshold amount of available bandwidth. The threshold amount of available bandwidth may be defined and configured at the access point 105 such that the threshold bandwidth is large enough to provide for the demands of additional client devices and any increased demands by client devices currently associated with the high frequency band 120. The threshold bandwidth may be tuned to prevent thrashing conditions (e.g., repeated association and disassociation from an access point) that may cause client devices to be moved back and forth between a low frequency band 115 of FIG. 1 and the high frequency band 120.

If, at 410, the determination is made that spare capacity does not exist on the high frequency band, the process 400 may proceed to 415. At 415, the access point 105 may delay a next band measurement. For example, a delay period may be established at the access point 105 wherein the access point 105 must wait for the duration of the delay period before conducting a subsequent measurement of the high frequency band utilization. The delay period may be a configurable setting at the access point 105 and may, for example, be short enough to allow for a timely response to a data issue, but be long enough to avoid an unnecessary impact on processor performance at the access point 105. It should be understood that the delay period may be set to zero when a continuous monitoring of the band is desired.

Returning to 410, if the determination is made that spare capacity does exist at the high frequency band, the process 400 may proceed to 420. At 420, the status of a data client transmit buffer associated with a low frequency band (e.g., 2.4 GHz band) may be monitored and determined. The status of a data client transmit buffer (e.g., low frequency band transmit buffer 225 of FIG. 2) may be determined, for example, by the access point 105 (e.g., by the band steering module 215 of FIG. 2). In embodiments, the determined status of the low frequency band transmit buffer 225 may be based upon the current utilization of the low frequency band transmit buffer 225. For example, the status of the low frequency band transmit buffer 225 may be based upon the capacity of the buffer and the number of packets currently queued in the buffer. The band steering module 215 may retrieve measurements of one or more parameters associated with the transmission of data to one or more client devices over the low frequency band 115. For example, the band steering module 215 may retrieve from the low frequency band transmit buffer 225 parameters such as transmit airtime, physical layer (PHY) rate, number of transmit retries, and other parameters associated with data streams being output to one or more client devices.

At 425, the determination may be made whether one or more client devices (e.g., client devices 110 of FIG. 1) receiving data over the low frequency band 115 are operating outside of a parameter threshold. The determination whether one or more client devices are operating outside of a parameter threshold may be made, for example, by the access point 105 (e.g., by the band steering module 215 of FIG. 2). In embodiments, the access point 105 may measure one or more parameters (e.g., transmit airtime, physical layer (PHY) rate, number of transmit retries, etc.) associated with the transmission of data to each of one or more client devices receiving data over the low frequency band 115. Settings at the access point 105 may define constraints or thresholds for each of the measured client device parameters (e.g., maximum transmit airtime, minimum PHY rate, maximum number of transmit retries, etc.). For example, a maximum recommended transmit airtime for a client device may be configured to reflect best effort queue utilization by the client device.

If, at 425, the determination is made that one or more client devices are operating outside of a parameter threshold, the process 400 may proceed to 430. At 430, the one or more client devices that are operating outside of a parameter threshold may be removed from a list of client devices associated with the low frequency band. In embodiments, the band steering module 215 may maintain a list of client devices that may potentially be disassociated from the low frequency band. The one or more client devices determined to be operating outside of a parameter threshold may be removed from the list of client devices associated with the low frequency band, thereby removing the client devices operating outside of a parameter threshold from consideration for disassociation from the low frequency band.

At 435, a list of client devices associated with the low frequency band may be generated. With the client devices determined to be operating outside of a predetermined parameter threshold removed from the list of client devices associated with the low frequency band, the remaining client devices in the list may be considered for disassociation from the low frequency band. The remaining client devices in the list of devices associated with the low frequency band may be ordered in the list from lowest to highest air-time demand. It should be understood that the client devices may be ordered based on various other factors that can provide an indication of the wireless resources consumed by the individual client devices. For example, the client devices may be ordered in the list from weakest received signal strength indication (RSSI) to strongest RSSI.

Returning to 425, if the determination is made that there are no client devices associated with the low frequency band operating outside of a parameter threshold, the client devices associated with the low frequency band may be ordered within a list from lowest to highest air-time demand (or other parameter) at 435.

At 440, DPI information associated with each client device may be inspected to identify one or more client devices with active media sessions. DPI information may be retrieved and inspected, for example, by an access point 105 (e.g., by the packet inspection module 240 of FIG. 2). DPI information may be retrieved from a data stream that is being output to a client device over the low frequency band, and the DPI information may be used to classify the data stream being output to the client device. For example, a DPI signature file may be inspected, and the DPI signature file may include an identification or indication of a traffic category (e.g., media, video, gaming, web, mail, etc.), application processing the data stream (e.g., Netflix, Amazon Video, etc.), device type receiving the data stream (e.g., STB, gaming device, mobile device, tablet, computer, etc.), and others. Using the DPI information retrieved from a data stream, the packet inspection module 240 may determine whether the data stream is associated with a media session. For example, a data stream having a traffic classification of 'Video,' or 'Media,' a data stream being processed by an application such as Netflix or Amazon Video, and/or a data stream being received by a media player may individually or in combination with each other provide an indication to the packet inspection module 240 that the data stream is associated with a media session.

At 445, the list of client devices associated with the low frequency band may be modified based upon a classification of each client device as either a device receiving a data stream associated with a media session or a device that is not receiving a data stream associated with a media session. The list of client devices may be modified, for example, by the access point 105 (e.g., by the band steering module 215). In embodiments, the previous ordering of the client devices from lowest to highest airtime demand may be maintained, but each client device receiving a data stream associated with a media session is placed above all client devices not receiving a data stream associated with a media session such that the highest listed client device is a client device that has the lowest airtime demand and that is receiving a data stream associated with a media session.

At 450, the client device at the top of the modified list of client devices associated with the low frequency band may be identified. The highest listed client device may be identified, for example, by the access point 105 (e.g., by the band steering module 215). In embodiments, the modified list of client devices is ordered such that the highest listed client device is the client device receiving a data stream associated with a media session that has the lowest airtime demand relative to other client devices receiving a data stream associated with a media session.

At 455, the identified client device may be added to a low frequency band black list. The low frequency band black list may be stored at the black list data store 235 of FIG. 2. In embodiments, the low frequency band black list may include client devices that are to be precluded from associating with the low frequency band 115. Where the identified client device is listed in a high frequency band black list, the client device may be removed from the high frequency band black list before being added to the low frequency band black list.

At 460, the identified client device may be forced to disassociate from the low frequency band. For example, the access point 105 may output to the client device(s) a command to disassociate from the low frequency band (e.g., 802.11 disassociation command). Once the identified client device is disassociated from the low frequency band 115, and since the client device is now listed in the low frequency band black list, the client device may be forced to associate with a high frequency band (e.g., high frequency band 120 of FIG. 1). In embodiments, the transition of the identified client device from the low frequency band 115 to the high frequency band 120 may be delayed (e.g., at 415) until the media session currently being received by the client device terminates.

FIG. 5 is a block diagram of a hardware configuration 500 operable to facilitate client device band steering based upon deep packet inspection information. It should be understood that the hardware configuration 500 can exist in various types of devices. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In embodiments, the input/output device 540 may include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In embodiments, the input/output device can include driver devices configured to send communications to, and receive communications from one or more networks (e.g., subscriber network 130 of FIG. 1, WAN 125 of FIG. 1, etc.) and/or one or more client devices (e.g., client devices 110 of FIG. 1, etc.). The input/output device may include driver devices configured to send communications over one or more frequency bands (e.g., low frequency band 115 of FIG. 1, high frequency band 120 of FIG. 1, etc.).

Those skilled in the art will appreciate that the invention improves upon methods and apparatuses for client device band steering. The methods, systems, and computer readable media described herein may be operable to facilitate client device band steering based upon deep packet inspection information. An access point may be configured to steer one or more client devices from a low frequency band to a high frequency band, and vice versa, based on the status of the low frequency band and/or high frequency band and the client devices associated with the bands. The access point may perform a deep packet inspection of data packet traffic associated with each associated client device, and may classify each client device as either a device associated with a media session or a device that is not associated with a media session based upon information retrieved from the deep packet inspection. The access point may choose one or more client devices to disassociate from a frequency band based upon the media session classification of the client devices.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
    monitoring the status of one or more frequency bands;
    determining that a condition exists for disassociating one or more client devices from a first frequency band, wherein the condition is based upon the monitored status of the one or more frequency bands;
    identifying one or more client devices associated with the first frequency band;
    determining whether each respective one of the one or more client devices associated with the first frequency band is associated with a media session, wherein the determination whether a respective one client device is associated with a media session is based upon characteristics of one or more packets being output to the respective one client device, wherein the characteristics are retrieved through a deep packet inspection of the one or more packets, wherein the deep packet inspection of the one or more packets is carried out by an access point, and wherein the determination whether the respective one client device is associated with a media session is made using a deep packet inspection signature file that is downloaded and stored at the access point;
    identifying at least one client device from the one or more client devices associated with the first frequency band, wherein the at least one client device is identified based upon a determination that the at least one client device is not associated with a media session, and wherein the at least one client device is identified based upon a comparison between air-time demands of the at least one client device and air-time demands of one or more other client devices that are associated with the first frequency band and that are determined not to be associated with a media session; and
    disassociating the at least one identified client device from the first frequency band.

2. The method of claim 1, wherein the first frequency band is associated with a higher frequency than the frequency associated with a second frequency band, and the at least one identified client device comprises at least one client device determined not to be associated with a media session.

3. The method of claim 2, further comprising:
    for each respective one of the one or more client devices associated with the first frequency band, measuring one or more parameters associated with the resource demand placed on the first frequency band by the respective one client device; and
    wherein the at least one identified client device comprises a client device that is determined not to be associated with a media session and that places the largest resource demand on the first frequency band relative to the other client devices that are associated with the first frequency band and that are determined not to be associated with a media session.

4. The method of claim 2, wherein the condition for disassociating one or more client devices from a first frequency band comprises a determination that the excess data capacity associated with the first frequency band is less than a predetermined threshold.

5. The method of claim 1, further comprising:
    adding the at least one identified client device to a black list associated with the first frequency band, wherein the black list includes one or more client devices that are not allowed to associate with the first frequency band.

6. An apparatus comprising:
    one or more interfaces that provide a first frequency band and a second frequency band to one or more client devices;
    one or more modules that:
    monitor the status of one or more frequency bands;
    determine that a condition exists for disassociating one or more client devices from the first frequency band in favor of steering the client device to an association with the second frequency band, wherein the condition is based upon the monitored status of the one or more frequency bands;
        identify one or more client devices associated with the first frequency band;
    determine whether each respective one of the one or more client devices associated with the first frequency band is associated with a media session, wherein the determination whether a respective one client device is associated with a media session is based upon characteristics of one or more packets being output to the respective one client device, wherein the characteristics are retrieved through a deep packet inspection of the one or more packets, and wherein the determination whether the respective one client device is associated with a media session is made using a deep packet inspection signature file that is downloaded and stored at the apparatus;
        identify at least one client device from the one or more client devices associated with the first frequency band, wherein the at least one client device is identified based upon a determination that the at least one client device is not associated with a media session, and wherein the at least one client device is identified based upon a comparison between air-time demands of the at least one client device and air-time demands of one or more other client devices that are associated with the first frequency band and that are determined not to be associated with a media session; and initiate a disassociation of the at least one identified client device from the first frequency band.

7. The apparatus of claim 6, wherein the first frequency band is associated with a higher frequency than the frequency associated with the second frequency band, and the at least one identified client device comprises at least one client device determined not to be associated with a media session.

8. One or more non-transitory computer readable media having instructions operable to cause one or more processors to perform the operations comprising:

monitoring the status of one or more frequency bands;

determining that a condition exists for disassociating one or more client devices from a first frequency band in favor of steering the client device to an association with a second frequency band, wherein the condition is based upon the monitored status of the one or more frequency bands;

identifying one or more client devices associated with the first frequency band;

determining whether each respective one of the one or more client devices associated with the first frequency band is associated with a media session, wherein the determination whether a respective one client device is associated with a media session is based upon characteristics of one or more packets being output to the respective one client device, wherein the characteristics are retrieved through a deep packet inspection of the one or more packets, wherein the deep packet inspection of the one or more packets is carried out by an access point, and wherein the determination whether the respective one client device is associated with a media session is made using a deep packet inspection signature file that is downloaded and stored at the access point;

identifying at least one client device from the one or more client devices associated with the first frequency band, wherein the at least one client device is identified based upon a determination that the at least one client device is not associated with a media session, and wherein the at least one client device is identified based upon a comparison between air-time demands of the at least one client device and air-time demands of one or more other client devices that are associated with the first frequency band and that are determined not to be associated with a media session; and disassociating the at least one identified client device from the first frequency band.

9. The one or more non-transitory computer-readable media of claim 8, wherein the first frequency band is associated with a higher frequency than the frequency associated with the second frequency band, and the at least one identified client device comprises at least one client device determined not to be associated with a media session.

10. The one or more non-transitory computer-readable media of claim 9, wherein the instructions are further operable to cause one or more processors to perform the operations comprising:

for each respective one of the one or more client devices associated with the first frequency band, measuring one or more parameters associated with the resource demand placed on the first frequency band by the respective one client device; and wherein the at least one identified client device comprises a client device that is determined not to be associated with a media session and that places the largest resource demand on the first frequency band relative to the other client devices that are associated with the first frequency band and that are determined not to be associated with a media session.

11. The one or more non-transitory computer-readable media of claim 9, wherein the condition for disassociating one or more client devices from a first frequency band in favor of steering the client device to an association with a second frequency band comprises a determination that the excess data capacity associated with the first frequency band is less than a predetermined threshold.

* * * * *